E. J. Masters.
Field-Press.
Nº 96822. Patented Nov. 16, 1869.

Witnesses:
Inventor:

E. J. Masters.
Field-Press.
Nº 96822. Patented Nov. 16, 1869.
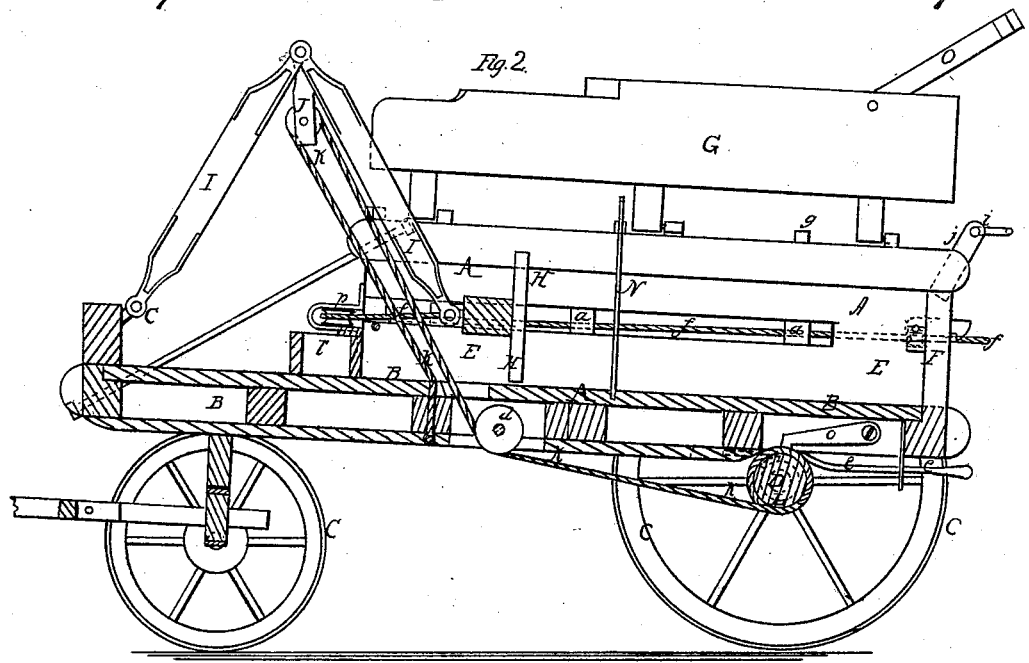
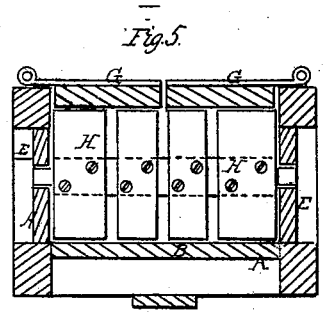
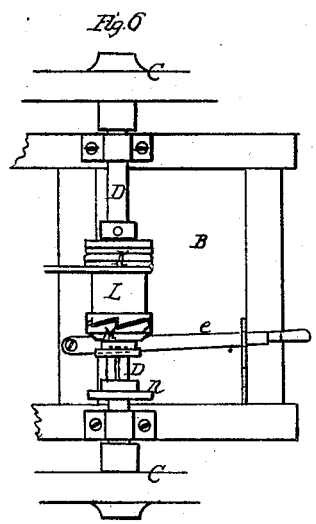
Witnesses:
Jno. P. Brook
Frank B. Lockley
Inventor:
E. J. Masters
per Munn & Co.

United States Patent Office.

E. J. MARSTERS, OF SHAW'S FLAT, CALIFORNIA.

Letters Patent No. 96,822, dated November 16, 1869.

IMPROVEMENT IN FIELD-PRESSES.

The Schedule referred to in these Letters Patent and making part of the same

*To all whom it may concern:*

Be it known that I, E. J. MARSTERS, of Shaw's Flat, in the county of Tuolumne, and State of California, have invented a new and improved Field-Press; and I do hereby declare that the following is a full, clear, and exact description thereof, which will enable others skilled in the art to make and use the same, reference being had to the accompanying drawings, forming part of this specification, in which—

Figures 1 and 2 are vertical longitudinal sections of my improved field-press, showing the parts in different positions.

Figure 5 is a detail vertical transverse section of the same.

Figure 6 is a detail inverted plan view of the same.

Similar letters of reference indicate corresponding parts.

Figure 1:
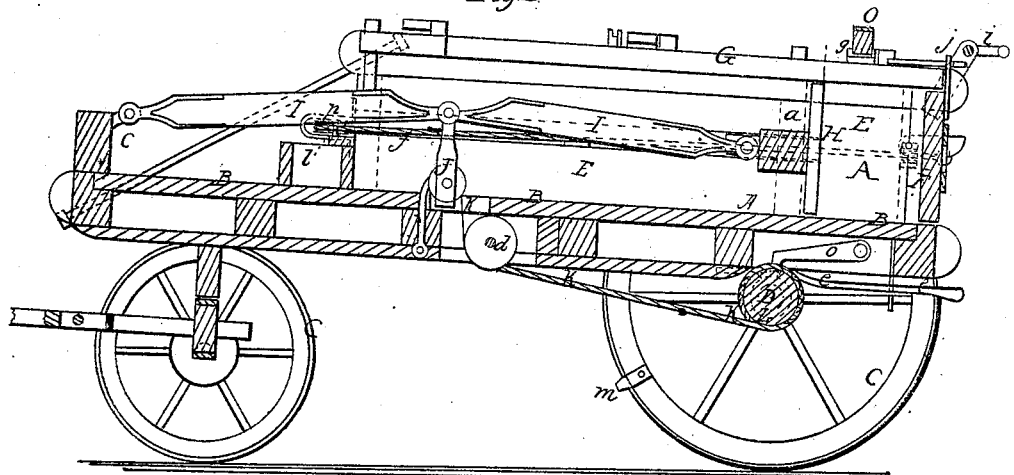
Figure 3:
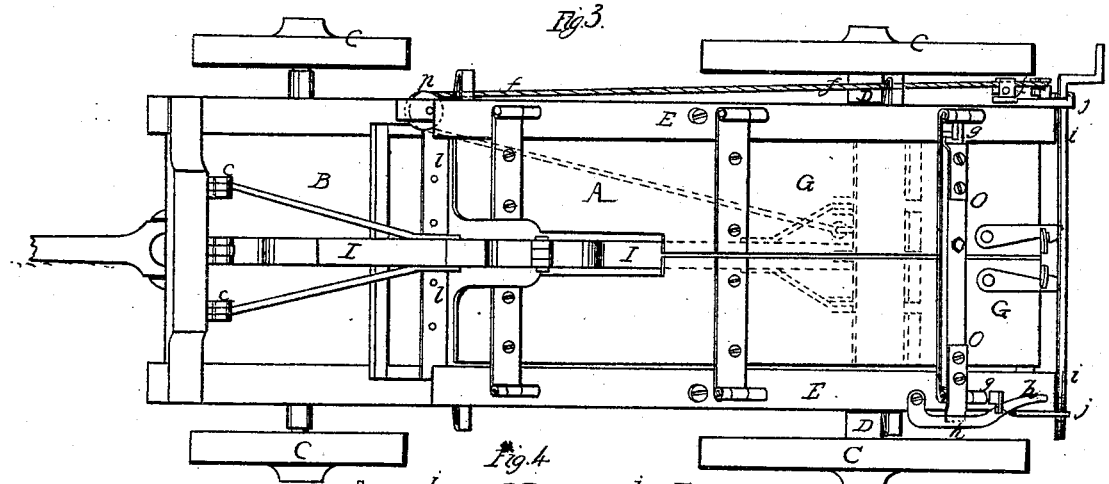
Figure 3 is a plan or top view of the same.
Figure 4:
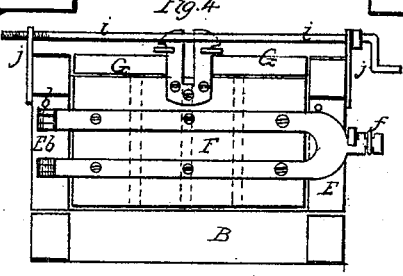
Figure 4 is a rear view of the same.

This invention relates to a new hay or cotton-press, which is arranged so that it can be readily transported from one place to another, to press the material directly on the field, or wherever it may be desired.

The invention consists in a bale of hay, straw, or like product, formed in such manner, that while its aliquot parts adhere with sufficient tenacity for all purposes of transportation, yet are susceptible of division by the application of slight force. This is a matter of great importance in the ready sale of such an article, and of great convenience to the public in purchasing.

The invention also consists in a new method of making divisible bales of any kind of long feed or other article susceptible of being baled, by putting into the press-chamber, at separate times, portions of the loose article, and interposing a partition between them. The object of the latter is to prevent the intertwining and interlocking of the stems, leaves, and offshoots of the product, along the division-line of said partition. This partition being withdrawn before the follower is actuated, the adhesion produced by power-pressure is amply sufficient for all purposes of transportation and handling, but will not resist manual force applied at the division-line or lines.

The invention also consists in certain improvements upon a portable press, by which hay, straw, or like products, may be conveniently baled, upon my method in the open field.

The press-frame A is supported on an inclined platform, B, which is mounted on wheels C C, like an ordinary wagon, except that the axle D of the hind wheels revolves with the same, the wheels being mounted upon it.

The axle of the front wheels is caused to turn on a king-bolt, as usual.

The press-box is formed by the platform B, which is its bottom, by two side planks E E, which project from the platform, and which are secured to posts *a a*, that are rigidly fastened to the same by a back plate, F, which is made, in form of a hinged door, on the back of the platform, it swinging on hinges *b*, that are secured to one of the side pieces E, by covers G G, which are hinged to the upper edges of the side pieces E, so that they can be swung up, and by a follower, H.

The follower is attached to a toggle-levers I, which works on a hinge, *c*, that is secured to the front part of the platform.

At its middle joint, the toggle-lever is provided with a suspended sheave-block, J.

A rope or chain, K, which has one end fastened to the platform, in front of the sheave-block, passes over the same, over a friction-pulley, *d*, and has its other end fastened to a drum, L, that is hung loose on the axle D.

On the same axle is also arranged a sliding clutch, M, which is operated by means of a lever, *e*, and which, when thrown against the drum L, locks the same, so that it will be revolved by the axle as the device is drawn forward over the ground.

When the drum is turned, to wind up the rope, it draws down the joint of the toggle-lever, and forces thereby the follower against the back plate F of the press. The follower will then compress any material placed between it and the said back plate.

When the bale has been finished, the clutch is thrown off the drum, and the door F opened, so that the bale may be removed. The follower is then withdrawn from the back plate, by raising the joint of the toggle-lever, or by directly drawing it back. The covers are then opened, and new hay or other material put into the press, for renewed action of the follower.

The device shown in the drawing for withdrawing the follower is a string, *f*, which is attached to the follower, passes over a friction-pulley, and then backward. Its back end may be fastened to the outer end of the door F, so that, as the same is opened, the follower may be simultaneously withdrawn.

N represents a small sheet-metal or other plate, which can be placed into the press when the follower is withdrawn, as in fig. 2, to form a transverse partition across the press-box, so that, as the hay or other material is thrown into the press, the said partition will keep the fibres separated. When the bale is to be formed, this partition is removed, and the material compressed, and the separated fibres will cause the two parts to adhere so loosely that two bales can readily be formed of one. When the follower is drawn back, the rope K unwinds from the drum, and is ready for the next compression. The vehicle is drawn ahead, while the act of pressing is carried on. When, however, the bale is taken out, and new material put in, the wagon is put at rest.

The machine may also be made entirely stationary, in which case the rear part is supported by suitable scaffolding, so that the rear wheels may not touch the ground.

When a bale is to be formed, the axle D is revolved by suitable mechanism.

The platform B is represented as being higher in front than it is in rear, for the purpose of throwing the whole weight of the follower, toggle-bars, and chain or rope against the hay while pressing, as well as for enabling the front wheels to turn under the platform.

The top doors G are locked down by a beam, O, which is pivoted to one of said doors, and which has hooks formed on one end, to catch over hooks $g$, that project from the side pieces E. It is held down by a lever, $h$, that is pivoted to one of the side pieces, and serves also to give a purchase when the doors are to be opened. It can, in that case, be swung out of the way on its pivot.

The beam O, when fastened over the hooks $g$, not only serves to hold the doors G down, but also prevents the press from spreading.

For the same purpose, of holding the side pieces E in proper position, I have arranged a transverse screw, $i$, through ears $j\,j$, that project from the side pieces. Should the said side pieces become loose, they can be readily readjusted in the proper position by turning the screw.

The bales can be tied by means of baling-ropes fitted through slots of the follower and back door in suitable manner. Pins $l\,l$ are secured to the platform B on the front part of the same, for the said baling-rope to be temporarily fastened to while the bale is being pressed.

Upon the hind wheels may be placed a series of clamps, $m\,m$, which are fitted over the tire, to prevent the wheels from slipping while a bale is being pressed. They can be readily removed.

The partition N is held in place, when used, by having feet projecting from its lower edge fit into apertures of the platform, while ears projecting from its sides will rest on notches formed on the side pieces. One or more such partitions may be used on one press.

On the axle D is also mounted a ratchet-wheel, $n$, into which a pawl, $o$, catches, to prevent the axle from turning backward.

The drum L on the axle D is formed tapering. The rope or chain, winding from the large to the small end, insures speed to the follower in the first part of its movement, and power at its last.

Having thus described my invention,

I claim as new, and desire to secure by Letters Patent—

1. A method of making divisible bales of hay and any like product, by placing, in the press-chamber, two or more portions of the loose article, at separate times, and inserting between the same a partition or plane of division, the said partition being withdrawn before the follower is actuated, all substantially as above set forth.

2. A divisible bale, made on the above method, as an article of manufacture.

3. The improved train of mechanism for actuating the follower, consisting of the sliding crab M, the loose crab-sleeve L, cord K, pulleys $d\,k$, strap J, and toggles I, all arranged in the manner described.

4. The combination of the door F and follower H with the cord $f$ and pulleys P, whereby the act of opening the door withdraws the follower, all as shown and described.

E. J. MARSTERS.

Witnesses:
 JOHN C. HASKELL,
 A. BULLERDIECK.